United States Patent Office 3,353,842
Patented Nov. 21, 1967

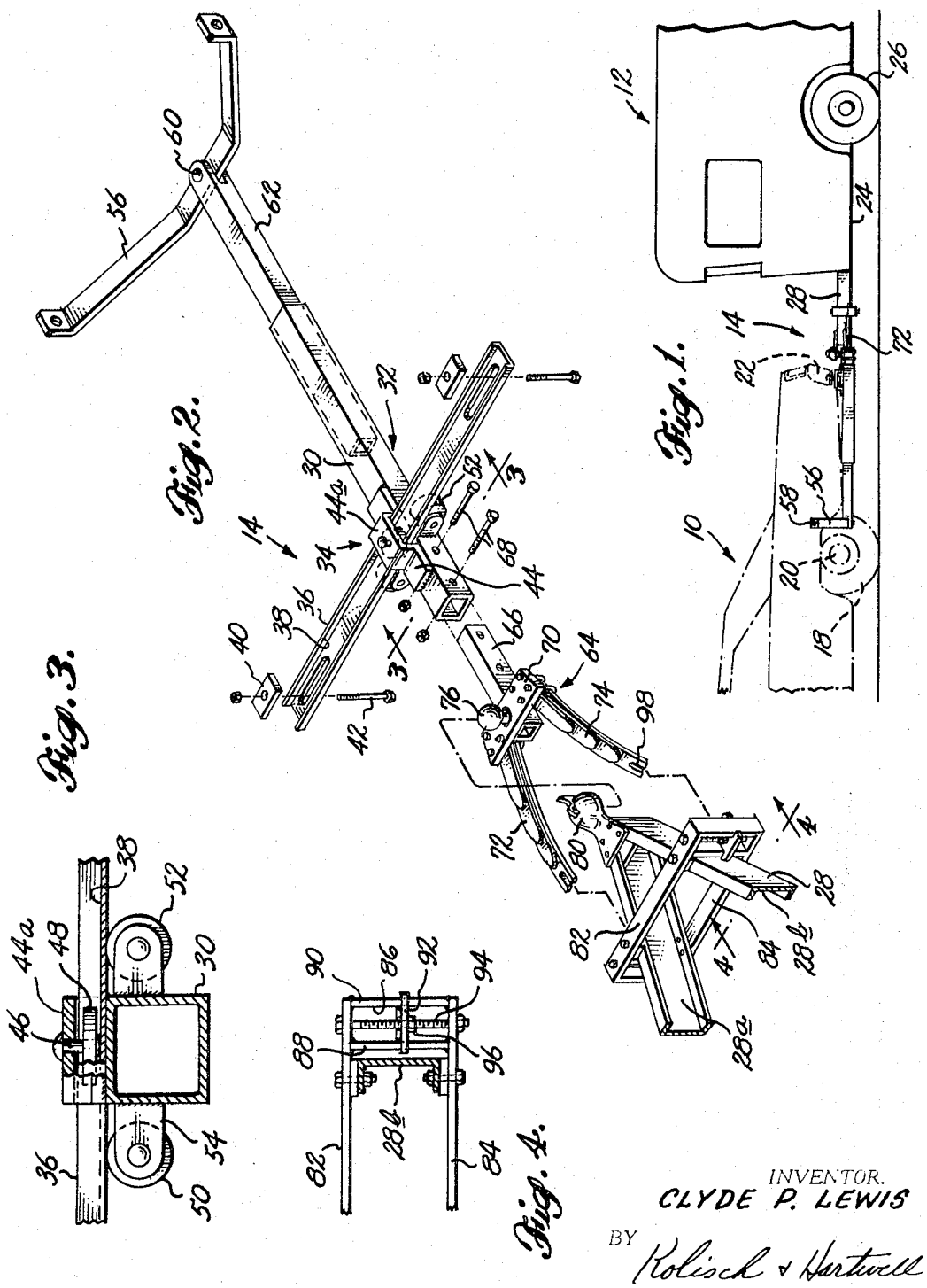

3,353,842
TRAILER HITCH
Clyde P. Lewis, Ketchikan, Alaska
(Rte. 3, Box 635, Corvallis, Oreg. 97330)
Filed Mar. 25, 1966, Ser. No. 537,521
6 Claims. (Cl. 280—447)

ABSTRACT OF THE DISCLOSURE

Draft means for interconnecting a towing vehicle and trailer, comprising towing structure adapted to tow the trailer and anchoring means for mounting the towing structure on the rear of a towing vehicle with the structure afforded lateral movement with respect to the vehicle. A connecting bar is pivotally mounted on the vehicle forwardly of the anchoring means, which provides a pivot axis for the anchoring means, and such connecting bar is extensible from another bar in the towing structure to permit lateral movement of the towing structure. The towing structure is articulated, with relative pivotal movement afforded about a transverse axis, at a point located between forward and rear portions thereof, and a spring operatively interposed between the forward and rear portions of the towing structure exerts a bias inhibiting dropping of the towing structure toward the ground in the region where such relative pivotal movement is permitted.

---

This invention relates to draft means whereby a trailer may be towed behind a towing vehicle, such as an automobile.

A general object of this invention is the provision of such draft means which affords ease of operation and improved control over the trailer and towing vehicle. Because of this latter feature, the hazards involved in towing a trailer with a vehicle are substantially reduced.

It is conventional in connecting a trailer to a towing vehicle, such as an automobile, to attach a tongue in the trailer through a suitable coupling or hitch to a portion of the towing vehicle located adjacent the bumper of the vehicle. With such an arrangement, and because of attendant leverages involved, on movement of the towing vehicle and trailer over the road, relative veering and swaying tend to result which can be quite pronounced at high speeds and when traveling over rough terrain. Such relative movement can be so pronounced as to make steering of the vehicle extremely difficult, and in some cases can set up a dangerously unstable condition. Still another disadvantage of a conventional type of construction, of the type generally described, is that a substantial portion of the weight of the trailer tends to be supported by the rear bumper and surrounding region of the automobile towing it, which has the effect of lifting up the front portion of the towing vehicle and further introducing problems of control and stability. Another object of this invention, therefore, is to provide novel draft means for connecting a trailer to a towing vehicle which takes care of the hereinabove indicated difficulties in a highly practical and satisfactory manner.

More specifically, a feature and object of this invention is the provision of trailer draft means of a novel form, so constructed that the effective pivot point of towing structure in the draft means is located well forwardly on the vehicle from the rear bumper, preferably adjacent the rear axle of the towing vehicle. In the preferred embodiment of the invention disclosed, the towing force transmitted to the trailer by forward motion of the vehicle is transmitted, not from this effective pivot point, but from an anchoring connection provided in the construction located rearwardly in the vehicle, such as adjacent the rear bumper. By reason of this construction, it is not necessary to fasten to the underside of the vehicle, adjacent its rear axle, any massive bracket structure such as would be necessary if the towing force were exerted at a point adjacent the effective pivot connection mentioned.

Another specific object of the invention is the provision of means for producing a distribution of load in the towing vehicle through a novel form of towing structure and biasing means, operable to produce a transfer of weight forwardly in the towing vehicle from the point where a towing force is exerted on the trailer.

In a specific and preferred embodiment of the invention, towing structure is provided which is mounted on the vehicle adjacent the rear end thereof, for example on the rear bumper, by anchoring means adapted to transmit a towing force to the trailer, which anchoring means affords a limited amount of play in the towing structure whereby the same is movable laterally of the vehicle. Extending forwardly from this towing structure is a connecting bar which is pivoted to a bracket or other means secured to the frame of the towing vehicle adjacent its rear axle. This connecting bar guides the towing structure, whereby when it moves laterally it in effect swings in an arc about the axis provided by the pivot connection between the connecting bar and the bracket. The towing structure extends rearwardly from the anchoring means to the frame of the trailer, and thus on forward motion of the vehicle the trailer is guided in a path determined by the elongated towing structure which in effect is pivoted to the towing vehicle. The towing structure where it extends rearwardly of the aforementioned anchoring means comprises a rear portion, which may take the form of a conventional trailer tongue, and a forward portion to which this rear portion is detachably connected, as by a coupler. Where these forward and rear portions of the towing structure are connected, relative pivotal movement is afforded about a generally horizontal and transversely extending axis, such movement being usually necessary to permit the towing vehicle to move over grades different from the grade the trailer is traveling over. Biasing means is included, however, which inhibits such relative movement, whereby under normal operating conditions a weight shift is produced in the towing vehicle.

These and other objects and advantages are attained by the invention, and the same is described hereinbelow in conjunction with the accompanying drawings:

FIG. 1 illustrates a towing vehicle towing a trailer through trailer draft means as contemplated herein;

FIG. 2 is an enlarged exploded view, in perspective, showing details of the trailer draft means;

FIG. 3 is a cross-sectional view, on an even larger scale, along the line 3—3 in FIG. 2; and FIG. 4 is a cross-sectional view, along the line 4—4 in FIG. 2.

Referring now to the drawings, wherein a particular embodiment of the invention is illustrated, a towing vehicle, such as an automobile, is shown at 10 which is connected to a trailer, shown at 12, through trailer draft means generally indicated at 14. The automobile includes rear wheels 18 supporting it from movement over the ground, and the usual rear axle 20 interconnecting the rear wheels. The rear bumper of the automobile is shown at 22. Trailer 12 includes the usual trailer frame 24, and is supported for movement over the ground on wheels, such as wheel 26. Protruding forwardly from the forward end of the trailer is a tongue 28, which tongue may form, as in the embodiment illustrated, part of the trailer draft means 14, as is described more completely.

Considering in more detail trailer draft means 14, and referring particularly to FIG. 2, shown at 30 is an elongated hollow bar of substantially rectangular cross section forming part of towing structure 32 in the construction. Bar 30 is anchored to the rear of vehicle 10, as to the usual brackets supporting bumper 22, by anchoring means 34. This anchoring means accommodates a limited amount of play in the bar, whereby the same is laterally movable with respect to the longitudinal axis of the towing vehicle.

Anchoring means 34 in the embodiment illustrated comprises a rail member 36 having a channel 38 defined along the top thereof. The rail member is affixed to the brackets supporting the bumper through keepers 40 and elongated fasteners 42. Fastened to the top of bar 30, as by welding, is a bracket 44 having a central portion 44a spaced above the top of bar 30. Portion 44a and the top of the bar define a passageway through which rail member 36 extends. Journaled as by pin 46 to bracket 44 (see also FIG. 3) is a roller 48 which rides within channel 38 defined along the top of the rail member. Engaging the underside of the rail member are rollers 50, 52 journaled on lugs 54, which are affixed to the sides of bar 30.

With the construction described, bar 30 is permitted lateral movement between limit positions defined by where the rail member is fastened to the bumper brackets. Furthermore, with forward motion of the vehicle, a towing force is transmitted to the trailer through rail member 36, roller 48, bracket 44, and bar 30.

As earlier discussed, a feature of the invention is the provision of means whereby the towing structure in effect pivots about a point spaced forwardly from the region where a towing force is applied. Describing now the structure making such possible, this invention contemplates means such as a bracket 56 (see FIG. 2), which is secured to the frame of the vehicle as at 58 (see FIG. 1) at a point directly adjacent rear axle 18 of the vehicle. Pivotally mounted on the bracket at a point intermediate its ends, at 60, is a connecting bar 62 of substantially rectangular cross section. This connecting bar extends rearwardly from its pivot connection with bracket 56, and has its rear end telescopically received within the hollow interior of bar 30. Thus, the connecting bar and bar 30 are mounted, one on the other, but in such a manner as to accommodate relative extension and contraction of the two.

With lateral movement of bar 30, the connecting bar causes bar 30 to swing angularly in the same manner as if bar 30 were pivoted to bracket 56. The extensible construction described permits this effective pivoting, with the portion of the bar mounting bracket 44 moving along essentially the straight path defined by channel 38. This angular movement of the bar 30 takes place about pin 46 mounting roller 48, with bracket 44 providing enough clearance for the movement to occur.

Towing structure 32 further includes an expanse extending rearwardly from rail 36 and anchoring means 34, comprising a spring and mounting assembly 64 (which constitutes a forward portion of this rearwardly extending expanse), and trailer tongue 28 already described (which constitutes a rear portion of this rearwardly extending expanse).

Assembly 64 comprises an elongated block 66 of substantially rectangular cross section. The forward end of this block fits within the interior of bar 30 and is fastened in place with fasteners 68. Secured to a rear portion of the block is a spring mounting plate 70, to which is fastened a pair of leaf springs 72, 74, which springs diverge from each other progressing toward their rear ends. Joined to the top of mounting plate 70 is a ball coupling part 76.

Tongue 28 comprises opposed beams 28a, 28b suitably rigidly interconnected, which converge and are joined together adjacent their forward ends. Mounted on these beams adjacent the forward end of the tongue is socket coupling part 80 adapted to be fitted over and seated on ball coupling part 76. The coupling mechanism further includes the usual means locking the ball and socket coupling parts together with the parts assembled. With the parts assembled, leaf springs 72, 74 straddle beams 28a, 28b forming the tongue of the trailer.

Straps 82, 84 extending transversely of beam 78 are joined to these beams adjacent their forward ends. On each side of the trailer tongue a pocket 86 is defined for receiving the rear end of a spring by means of pieces 88, 90 extending vertically between and secured to upper and lower straps 82, 84, and an adjustable support plate 92. An elongated threaded shank 94 extends between straps 82, 84 and through pocket 86, such shank passing through an accommodating bore provided in support plate 92. To elevate or lower the plate, a nut 96 screwed onto threaded shank 94 is provided, which has the support plate resting thereon. The rear end of a leaf spring may be notched, as at 98, whereby legs are presented which straddle shank 94 adjacent the region where such shank passes through the support plate.

Describing now how the apparatus may be used, and certain features and advantages thereof, to accommodate a vehicle for the mounting of the usual trailer tongue bracket 56 is mounted as described on the vehicle frame. Rail member 36 is secured in place, and bar 30 and connecting bar 62 assembled as shown in FIG. 2. Assembly 64 is mounted on the rear of bar 30 as described. The tongue of the trailer is then secured to assembly 64, through the usual socket coupling part, which is fitted onto ball coupling part 76. With the trailer tongue secured to assembly 64, the springs which straddle the forward part of the tongue in effect inhibit relative pivotal movement of the trailer tongue with respect to assembly 64 about an upright axis.

The pressure applied by the leaf springs is then adjusted, through adjustment of the position of plates 92, to produce a weight shift in the towing vehicle. The ball and socket coupling parts in the coupling accommodate relative pivotal movement between assembly 64 and the tongue of the trailer about a horizontal, transversely extending axis. With a good portion of the weight of the trailer supported by the tongue, and with no biasing exerted by the springs, the rear bumper of the towing vehicle is forced downwardly with relatively pivotal movement between assembly 64 and the tongue about the horizontal transverse axis occurring. With springs 72, 74 tensioned, such relative pivotal movement is resisted, and transfer of trailer weight occurs from the rear bumper to bracket 56. This, of course, has the desirable advantage of preventing overloading of the rear of the automobile, and causing more weight to be supported by the automobile's front wheels. The springs, however, yield to an extent, permitting the rear of the towing vehicle to drop relative to the trailer when necessary, as for instance when the towing vehicle initially starts up an incline not yet reached by the trailer.

When towing the trailer along the road with the construction described, relative pivotal movement between the two units occurs about pivot 60, which is directly adjacent where the towing vehicle is supported on the ground by its rear wheels. Relative lateral forces exerted between the drawing and trailing units, therefore, do not result in excessive swaying or veering in either of the units, since these forces are directly absorbed by the towing vehicle's rear wheels, which in a transverse direction are substantially aligned with pivot 60.

A towing force is transmitted from the vehicle to the trailer through the anchoring connection described, which is adjacent the rear bumper and thus rearwardly in the vehicle from pivot 60. This feature reduces the modification required in the drawing vehicle adjacent its rear axle.

While an embodiment of the invention has been described, obviously variations and modifications are possible without departing therefrom. It is desired to cover all such variations as would be apparent to one skilled in the art, and that come within the scope of the appended claims.

It is claimed and desired to secure by Letters Patent:

1. Draft means for a trailer with frame, comprising towing structure adapted to tow the trailer, anchoring means for mounting the towing structure on the rear of a towing vehicle with the structure afforded a limited amount of play whereby the same is movable laterally of the vehicle, said anchoring means including means which on movement of the towing vehicle is operable to transmit a towing force from the vehicle to the towing structure, means producing for the towing structure when mounted on a vehicle an effective pivot about which the structure pivots, which pivot point is located forwardly on the vehicle from said anchoring means, said means comprising an elongated bar mounted on and extending forwardly from the towing structure and means mounting a forward end of the bar to the towing vehicle at a point located forwardly of said anchoring means, said towing structure extending in an elongated expanse rearwardly from the anchoring means to a point adapted to be connected with the frame of the trailer, said expanse of the towing structure being articulated with relative pivotal movement afforded between forward and rear portions of said expanse, and biasing means operatively interposed between the forward and rear portions of said expanse of the towing structure inhibiting dropping of the towing structure toward the ground in the region where said relative pivotal movement is afforded in said towing structure.

2. The trailer draft means of claim 1, wherein said towing structure comprises another bar substantially aligned with said connecting bar, and said connecting and other bar are mounted, one on the other, by means accommodating relative extension and contraction of the two bars.

3. The trailer draft means of claim 2, wherein said anchoring means includes rail means defining a track extending transversely of the towing vehicle, and said towing structure is movable within defined limits along said rail means.

4. Draft means for a trailer with frame comprising, with the draft means in operative position on a towing vehicle, towing structure adapted to tow the trailer including a bar extending generally longitudinally of the vehicle, anchoring means mounting the towing structure on the rear of the towing vehicle including rail means defining a track extending transversely of the towing vehicle and means mounting said bar on said rail means permitting lateral shifting of the bar along said track, an elongated connecting bar extending forwardly from the first-mentioned bar in the towing structure, means mounting one bar on the other with the bars relatively extensible and contractible, and means pivotally connecting the forward end of the connecting bar on the towing vehicle at a point located forwardly of said anchoring means.

5. The trailer draft means of claim 4, wherein said towing structure, with the same mounted in operative position on a towing vehicle, extends in an elongated expanse rearwardly from said rail means, and said expanse includes a forward portion mounted on said rail means and guided for movement therealong, and a rear portion detachable from the forward portion to permit separation of the trailer.

6. The trailer draft means of claim 5, which further includes biasing means operatively interposed between said forward and rear portions of said expanse of the towing structure, operable to inhibit dropping of the towing structure toward the ground where said rear portion is detachably connected to said forward portion of the towing structure.

References Cited
UNITED STATES PATENTS

| | | | |
|---|---|---|---|
| 1,780,503 | 11/1930 | Paul | 280—499 X |
| 1,852,537 | 4/1932 | Paul | 280—446 |
| 2,414,248 | 1/1947 | Townsend | 280—447 |
| 2,752,341 | 10/1951 | Hoffman | 280—446 |

LEO FRIAGLIA, *Primary Examiner.*